(12) United States Patent
Heinrich et al.

(10) Patent No.: US 9,003,091 B2
(45) Date of Patent: Apr. 7, 2015

(54) FLOW CONTROL FOR A SERIAL PERIPHERAL INTERFACE BUS

(71) Applicant: Hewlett-Packard Development Company, L.P., Houston, TX (US)

(72) Inventors: David F. Heinrich, Tomball, TX (US); Theodore F. Emerson, Tomball, TX (US); Kevin B. Leigh, Houston, TX (US); Vincent Nguyen, Houston, TX (US); Andrew Brown, Houston, TX (US); Gary Thome, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 13/655,241

(22) Filed: Oct. 18, 2012

(65) Prior Publication Data

US 2014/0115209 A1    Apr. 24, 2014

(51) Int. Cl.
*G06F 13/00*        (2006.01)
*G06F 3/00*         (2006.01)
*G06F 13/42*        (2006.01)

(52) U.S. Cl.
CPC .................................. *G06F 13/4291* (2013.01)

(58) Field of Classification Search
USPC ............... 710/11, 16, 29, 105–106, 110, 710/305–306, 309, 311, 313–315
See application file for complete search history.

(56) References Cited

U.S. PATENT DOCUMENTS

| | | | |
|---|---|---|---|
| 6,857,040 B2 | 2/2005 | Noonan et al. | |
| 7,082,481 B2 | 7/2006 | Lambrache et al. | |
| 7,308,516 B2 | 12/2007 | Dressen et al. | |
| 7,328,290 B2 | 2/2008 | Leigh et al. | |
| 7,577,877 B2 | 8/2009 | Emerson et al. | |
| 8,060,681 B2 | 11/2011 | Russo et al. | |
| 2002/0091826 A1* | 7/2002 | Comeau et al. | 709/226 |
| 2006/0224803 A1* | 10/2006 | Zinaty et al. | 710/110 |
| 2006/0277346 A1 | 12/2006 | Doak et al. | |
| 2007/0186021 A1* | 8/2007 | Drexler et al. | 710/260 |
| 2009/0055125 A1* | 2/2009 | Ou Yang et al. | 702/176 |
| 2009/0105985 A1* | 4/2009 | Steger et al. | 702/127 |
| 2011/0153900 A1* | 6/2011 | Zitlaw | 710/313 |
| 2011/0238866 A1* | 9/2011 | Zitlaw | 710/5 |
| 2012/0179015 A1* | 7/2012 | Mann et al. | 600/365 |
| 2012/0239848 A1* | 9/2012 | Alon et al. | 710/308 |
| 2013/0073810 A1* | 3/2013 | Alon et al. | 711/137 |
| 2013/0297829 A1* | 11/2013 | Berenbaum et al. | 710/3 |
| 2014/0052881 A1* | 2/2014 | Alley | 710/110 |
| 2014/0208070 A1* | 7/2014 | Alley et al. | 712/31 |

OTHER PUBLICATIONS

I2C/SPI Slave to UART/IrDA/GPIO Bridges; http://ics.nxp.com/products/bridges/i2c.spi.slave.uart.irda.gpio/ © 2006-2012 NXP Semiconductors.
SPI Master/slave Interface :: Overview; http://opencores.org/project,spi_master_slave; May 16, 2011.

* cited by examiner

*Primary Examiner* — Thomas J Cleary
(74) *Attorney, Agent, or Firm* — International IP Law Group, PLLC

(57) ABSTRACT

Systems and methods for flow control within a Serial Peripheral Interface without additional signal lines are included herein. In one example, a method includes generating a flow control command. The method also includes sending the flow control command from a master device to a slave device with a Serial Peripheral Interface. In addition, the method includes sending a memory address from the master device to the slave device. Furthermore, the method includes detecting a ready indicator in the master device. The method also includes waiting to receive a ready indicator and communicating with the slave device in response to the ready indicator.

19 Claims, 11 Drawing Sheets

400

600

FLOW CONTROL FOR A SERIAL PERIPHERAL INTERFACE BUS

BACKGROUND

Hardware components of modern computing systems can communicate using a variety of different communication protocols. One of the communication protocols, the SPI (Serial Peripheral Interface), allows for two devices to communicate with a master/slave relationship. The master device can send commands to the slave device and the slave device can process the commands.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
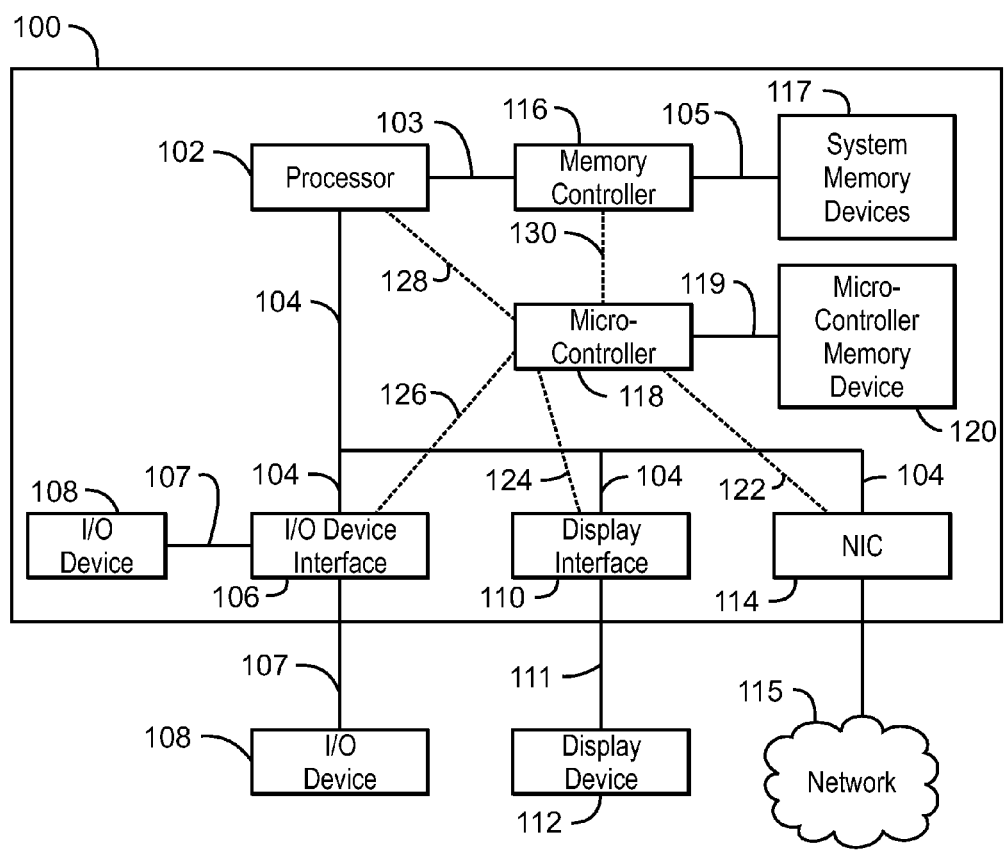
FIG. 1 is a block diagram of an example computing system that can implement flow control between a master-slave pair of devices using a Serial Peripheral Interface bus.

A SPI device can be a master device that initiates a SPI (Serial Peripheral Interface) bus transaction or a slave device that can accept SPI bus transactions. According to the industry standard SPI bus protocol, when a master device initiates a bus transaction to a slave device, the slave device completes the bus transaction according to the timing specification of the SPI bus protocol. In one example, when a slave device is to be interfaced to a master device, the slave device may not be able to complete a requested bus transaction within a time allotted by the SPI bus timing specification because of a delayed operation, such as accessing data from a slow storage device. In another example, when a slave device is to be interfaced to multiple master devices, the slave device may not be able to complete a requested bus transaction by a master device within a time allotted by the SPI bus timing specification because the slave device might still be busy with an operation requested by a different master device. A flow control method can enable communication between a slave device and a master device, when the SPI bus protocol timings cannot be met for a requested bus transaction. Various methods have been developed to implement flow control for SPI. Some of the methods that implement flow control for SPI bus rely on an extra control logic signal line that indicates the status of a device. Adding a control logic signal line involves changes to the device architecture to accommodate the added control signal line. However, changing the architecture of devices that use SPI bus to include an additional control logic signal does not allow for flow control in legacy devices that do not have the additional control logic signal.

The techniques disclosed herein describe transmitting flow control commands between two devices communicating through a SPI bus without additional control logic signal lines. For example, standard commands and flow control commands may use the same standard signal lines. Flow control commands can allow a slave device to accept commands from multiple master devices and respond with corresponding flow control cycles or completion cycles to the corresponding master devices. For example, a master device may store and retrieve firmware and/or data from a slave device via a SPI bus where a memory device to store the firmware and/or data is coupled locally to the slave device and accessible by the slave device. The slave device can be implemented to respond to read and write commands sent to the slave device by the master device according to the SPI bus protocol timing specification. However, when multiple master devices communicate firmware and/or data with a memory device that can be accessed locally and only by a slave device, the slave device may not be able to respond to the multiple master devices per the SPI bus protocol timings. Flow control (read and write) commands can allow a slave device to accept the commands from a master device and respond with corresponding flow control cycles or completion cycles to the master device. The techniques described herein enable multiple SPI masters to share remote memory storage accessible via a SPI slave by queuing and deferring completion of the read and write requests. For example, the read and write request may be deferred for any suitable period of time by using flow control commands that can indicate to one or more SPI masters that a SPI slave is busy performing other tasks.

FIG. 1 is a block diagram of an example computing system that can implement flow control between a master-slave pair of devices using a SPI bus. The computing system 100 may be, for example, a server computer, a mobile phone, laptop computer, desktop computer, or tablet computer, among others. The computing system 100 may include a processor 102 that is adapted to execute stored instructions. The processor 102 can be a single core processor, a multi-core processor, a computing cluster, or any number of other configurations.

The processor 102 may be connected through a system bus 104 (e.g., PCI), which is shown as a multi-drop bus, but can be a point-to-point interface (e.g., PCI Express®, HyperTransport®, among others), to an input/output (I/O) device interface 106 adapted to connect the computing system 100 to one or more I/O devices 108 through bus 107. The I/O devices 108 may include, for example, a storage device and a user interface device, wherein the user interface device may include a touchpad or a touchscreen, a keyboard, or a pointing device, among others. The I/O devices 108 may be built-in components of the computing system 100, or may be devices that are externally connected to the computing system 100.

The processor 102 may also be linked through the system bus 104 to a display interface 110 adapted to connect the computing system 100 to a display device 112 through bus 111. The display device 112 may include a display screen that is a built-in component of the computing system 100. The display device 112 may also include a computer monitor, television, or projector, among others, that is externally connected to the computing system 100. Additionally, the processor 102 may also be linked through the system bus 104 to a network interface card (NIC) 114. The NIC 114 may be adapted to connect the computing system 100 through the system bus 104 to a network 115. The network 115 may be a local area network (Ethernet LAN), or a wireless (WiFi) network, among others.

The processor 102 may also be linked to the memory controller 116 via a system memory controller interface 103. The system memory controller interface 103 can be QPI (Quick Path Interconnect), cHT (coherent HyperTransport), among others. The memory controller 116 can connect to system memory devices 117 via memory bus 105. The memory bus 105 can be a SMI, DDR3, DDR4, among others. System memory devices 117 can be SRAM, DRAM, RRAM, PRAM, memristor, non-volatile memory, or any other suitable memory systems. The micro-controller 118 can communicate with hardware components, such as the NIC 114, display interface 110, I/O device interface 106, processor 102 and memory controller 116, via the SPI buses 122, 124, 126, 128 and 130, respectively. The micro-controller is linked to the micro-controller memory device 120 via the micro-controller memory bus 119. The micro-controller memory device 120 can include data, such as firmware images, system configuration information and device configuration information. The NIC 114 can request data from the micro-controller memory device 120 through the micro-controller 118. The micro-controller 118 can access data stored in micro-controller memory 120 and send the requested data to the NIC 114 through the SPI bus 122. Similarly, the display interface 110, the I/O device interface 106, the processor 102 and the memory controller 116 can request data from the micro-controller memory device 120 through the micro-controller 118 by using flow control commands. The micro-controller 118 can access the corresponding data stored in the micro-controller memory 120 and send the data to the display interface 110, the I/O device interface 106, the processor 102 and the memory controller 116 via the SPI bus 124, 126, 128 and 130, respectively, by using a flow control command that can regulate the SPI bus completion cycles. The flow control commands and related flow control regulating cycles are discussed in greater detail below in relation to FIGS. 2-10.

It is to be understood that the block diagram of FIG. 1 is not intended to indicate that the computing system 100 is to include all of the components shown in FIG. 1. Rather, the computing system 100 can include fewer or additional components not illustrated in FIG. 1. In one example, the computing system 100 may include additional processors, memory controller devices, network interfaces, microcontrollers, microcontroller memory, etc. In some examples, the computing system 100 may not include the display device 112. Furthermore, any of the functionalities of the micro-controller 118 may be partially, or entirely, implemented in hardware or in the processor 102. For example, the functionality may be implemented with an application specific integrated circuit, in logic implemented in the processor 102, or in a co-processor on a peripheral device, among others.

Figure 2:
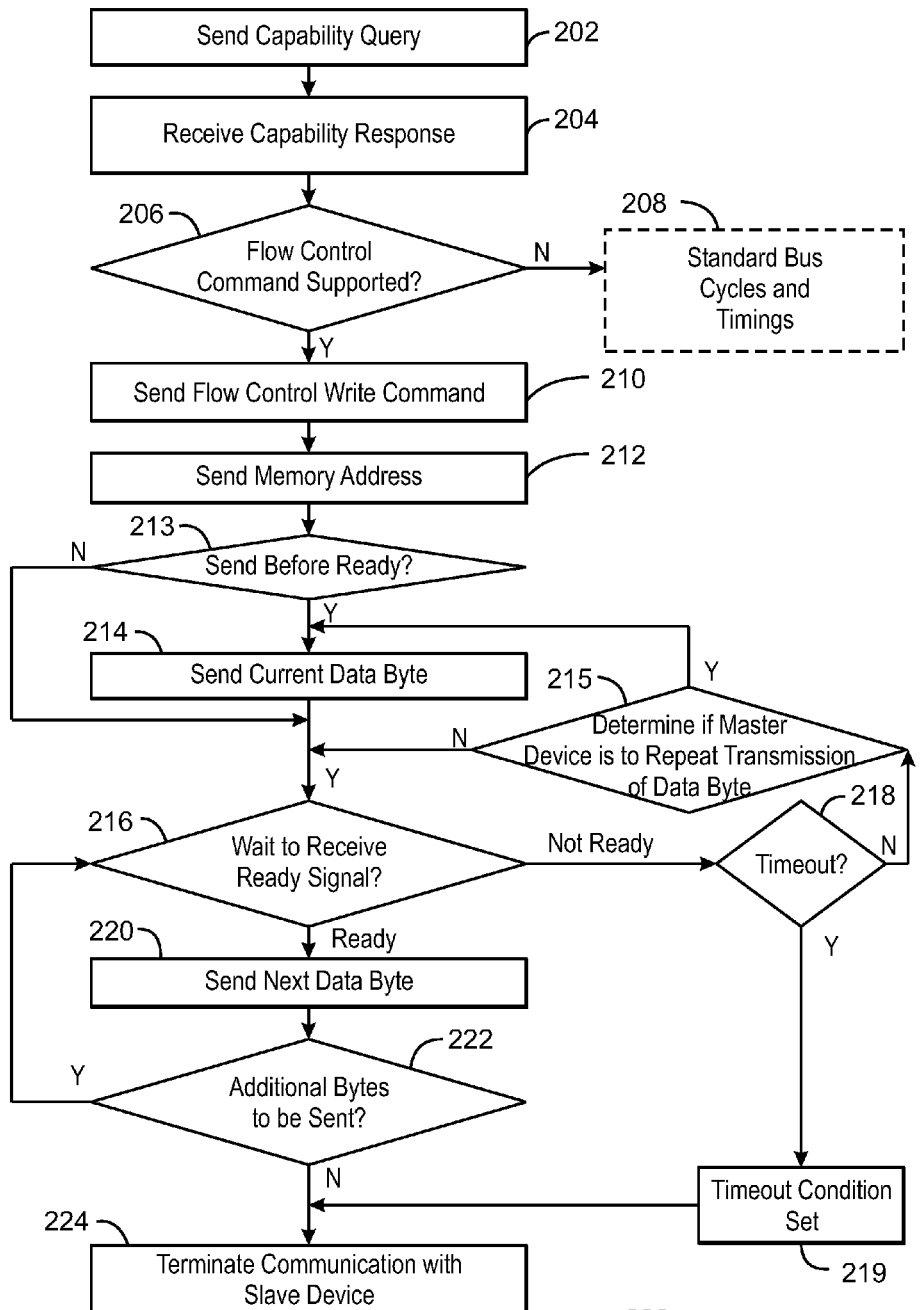
FIG. 2 is a process flow diagram illustrating an example of a method for a master device to send a flow control write command to a slave device using a SPI bus.

FIG. 2 is a process flow diagram illustrating an example of a method for a master device to send a flow control write command to a slave device using a SPI bus. A SPI bus is a synchronous serial data link that can operate in full duplex mode, i.e., transmit and receive signals can occur simultaneously on separate signal paths synchronized by a common clock signal. The method 200 can be used to allow for flow control between a master device and a slave device communicating through a SPI bus in a computing system, such as the computing system 100 of FIG. 1. The method 200 may be implemented by hardware components that can send flow control read and write commands, such as a processor 102, an I/O device interface 106, a display interface 110, a memory controller 116 or a NIC 114.

At block 202, the master device sends a capability query to the slave device. The capability query can detect whether a slave device can recognize and support flow control commands. At block 204, the master device receives a capability response from the slave device. The capability response may indicate whether a slave device can detect flow control commands, unidirectional or bidirectional use of the signal lines, initial write buffer size, etc. The initial write buffer size can indicate the number of bytes that can be sent from a master device to a slave device before detecting if the slave device is ready to receive data. At block 206, the master device determines if the capability response from the slave device indicates that the slave device can support flow control commands. If the slave device does not support flow control commands then the process flow continues to block 208 by sending standard write commands to the slave device and expecting the standard SPI bus protocol cycles and timings. If the slave device supports flow control commands, then the process flow proceeds to block 210 and sends a flow control write command. A flow control write command, as referred to herein, allows a master device to write data to a slave device.

At block 212, a master device can send a memory address to a slave device. The memory address can be any suitable number of bytes that indicate the location to store data in the slave device. In some examples, the memory address can be stored in a register or buffer in the slave device. In these examples, the memory address may be accessed at a later time when the slave device can complete the flow control write command. For example, the slave device may receive a memory address corresponding to the flow control write command. The slave device may complete a previous command for a number of clock cycles before the slave device can complete the write command. In this example, the slave device can store the memory address in a buffer or register until the slave device completes the flow control write command. In some examples, the slave device can remove the memory address stored in a buffer or register after the slave device completes the flow control write command.

At block 213, the master device determines whether the master device is configured to send a data byte to the slave device before the ready indicator is received. If the master device is configured to send a data byte to the slave device before receiving the ready indicator, the process flow continues at block 214. If the master device is not configured to send a data byte to the slave device before receiving the ready indicator, the process continues at block 216.

At block 214, the master device may send the current byte of data to the slave device. For the initial step of the process, the current byte of data is the first byte of data stored at the memory address in the flow control write command. In some embodiments, the master device may also send several sequential bytes that follow the first byte of data. For example, the slave device may communicate during the capability query that the slave device includes an initial write buffer that can store any suitable amount of data. The initial write buffer can then store any suitable amount of data before the slave device responds to the master device with a ready or not-ready indicator.

In some examples, the master device may continuously send the first byte of data to be written to the slave device if the slave device does not have sufficient buffer space to receive the first byte of data. The master device may continuously send the first byte of data to the slave device until the slave device sends a ready indicator to the master device. In another example, the master device can continuously send the last byte of data sent in block 214. When the slave device is ready to receive data, the slave device can have the first byte or a first set of bytes ready to write.

At block 216, a master device can determine if a ready indicator or a not-ready indicator is received. In some examples, the not-ready indicator can be an indicator of any suitable number of bits with any suitable bit patterns. For example, "01110111" may represent the not-ready indicator, which indicates to the master device that a slave device is not ready to respond. In some examples, the not-ready indicator can contain bit pattern to signify the not-ready state and followed by a bit pattern signifying the time remaining for the not-ready state (e.g., number of clock cycles). In some examples, the not-ready indicator can indicate the status of a slave device, such as whether the slave device is executing a command for another master device. If a not-ready indicator is received, the process flow continues at block 218. If a ready indicator is received, the process flow continues at block 220.

At block 218, the master device determines if a timeout value has exceeded a threshold. The timeout value can be stored as a counter and can indicate that a flow control command is to be terminated by the master device after the timeout value exceeds a threshold value. A timeout can indicate that the master device is to stop waiting for a ready indicator after the timeout value has exceeded a threshold. If a timeout value has exceeded a threshold, the process flow continues at block 219 where a timeout condition is set. A timeout condition may include setting a timeout register. A timeout condition may also include triggering other system alert mechanisms. If a timeout value has not exceeded a threshold, the process flow continues at block 215.

At block 215, the master device determines whether the master device is to resend the previous data byte. If the master device is to resend the previous data byte, the process flow continues at block 214 by sending the previous data byte (i.e. the last transmitted date byte). If the master device is not to resend the previous data byte, the master device determines if a ready indicator has been received at block 216.

When a ready indicator is detected at block 216, the process flow continues to block 220. At block 220, a master device sends additional data corresponding to the write command to a slave device in response to a ready indicator. The ready indicator may be an indicator of any suitable number of bits and any suitable bit patterns. For example, the ready indicator may be represented by "00101010." In other examples, the ready indicator may be a logical 1 that follows a series of logical 0's, or a logical 0 that follows a series of logical 1's. The flow control write process continues at block 222.

At block 222, the master device determines if additional bytes of data are to be sent for the write command. If additional bytes of data are to be sent from the master device to a slave device, the process flow continues at block 216 and the master device sends additional bytes as described before. If additional bytes of data are not to be sent from a master device to a slave device, the process flow ends at block 224. At block 224, the master device terminates communication with the slave device. In some examples, the master device can terminate communication with the slave device by negating a communication signal associated with the slave device.

The process flow diagram of FIG. 2 is not intended to indicate that the steps of the method 200 are to be executed in any particular order, or that all of the steps of the method 200 are to be included in every case. For example, the master device may not send a capability query to the slave device. In some examples, the master device may detect whether a slave device can support flow control commands based on a particular implementation. Further, any number of additional steps may be included within the method 200, depending on the specific application.

Figure 3:
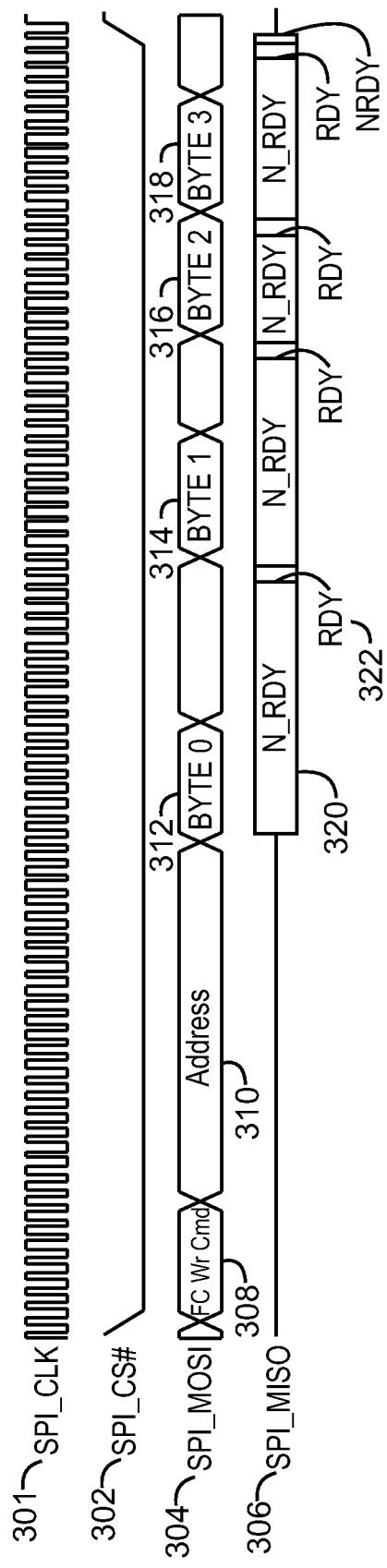
FIG. 3 is an example of a timing diagram for a master device sending a flow control write command to a slave device using a Serial Peripheral Interface bus.

FIG. 3 is an example of a timing diagram for a master device sending a flow control write command to a slave device. The timing diagram includes a clock (also referred to herein as SPI_CLK) 301, and three signals including a chip select signal (also referred to herein as SPI_CS#) 302, a master-out slave-in signal (also referred to herein as SPI_MOSI) 304, and a master-in slave-out signal (also referred to herein as SPI_MISO) 306. The clock 301 is issued by the master device for the slave device to synchronously communicate with the master device, including to toggle the SPI_MISO 306 signal from 1 to 0, or 0 to 1, as well as to sample the SPI_CS# signal 302 and the SPI MOSI signal 304. The SPI_CS# signal 302 is generated by the master device to indicate to a particular slave device that the slave device is selected to communicate with the master device. In some examples, a slave device is coupled to a master device using the signal set 301, 302, 304 and 306. In other examples, multiple master devices are coupled to a slave device using multiple independent signal sets 301, 302, 304 and 306. In some embodiments, each master device may have multiple slave devices sharing the SPI bus signals. The negative-true chip select signal, represented as SPI_CS#302 in FIG. 3, indicates the high state and low state of the chip select signal. The high state, as referred to herein, includes a signal level equivalent to a logical 1, where the slave device is not enabled to communicate with the master device. The low state, as referred to herein, includes a signal level equivalent to a logical 0, where the slave device is enabled to communicate with the master device.

The master-out slave-in signal 304, also referred to as SPI_MOSI, can transmit data and commands from the master device to the slave device. In some examples, the master device can send a flow control write command 308 to a slave device through the master-out slave-in signal 304 after the master device asserts the chip select signal 302 to the slave device. The master device can also send a memory address 310 through the master-out slave-in signal 304 to the slave device. In some examples, the memory address 310 can indicate a starting location in the memory of the slave device to store data from the master device. The master device can also send data corresponding to a flow control write command to the slave device through the master-out slave-in signal 304. In some examples, the master device can send the first byte of data 312 to be stored in the slave device multiple times before sending the additional bytes of data 314, 316, and 318 that are to be stored in the slave device. In other examples, the master device can send more than one byte of data 312 and 314 to be stored in the slave device, and the master device can send the last byte 314 to be stored in the slave device multiple times before sending the additional bytes 316 and 318 of data to be stored in the slave device.

In some examples, the slave device can also send indicators to the master device through the master-in slave-out signal 306. The indicators can include a not-ready indicator 320 and a ready indicator 322, among others. The slave device can send a not-ready indicator 320 to the master device through the master-in slave-out signal 306 if the slave device is busy.

For example, the slave device can send a not-ready indicator when the slave device continues to store data received from previous write commands In some examples, the master device can continue to send multiple copies of the first byte of data 312 corresponding to a flow control write command 308 if the master device receives a not-ready indicator 320. These examples are discussed in further detail below in relation to FIG. 4. Continuously sending the first byte of data to the slave device enables the slave device to have at least one byte of data corresponding to the flow control write command ready to be stored in the slave device's memory.

The slave device can send a ready indicator 322 to the master device when the slave device is ready to receive additional data from the master device. The master device can continue sending any number of bytes of data 316 and 318 to the slave device that correspond with the flow control write command 308. In other examples, the master device can send the first byte of data 312 and multiple copies of the second byte of data 314 corresponding to a flow control write command 308 if the master device receives a not-ready indicator 318. The slave device can send a ready indicator 322 to the master device when the slave device is ready to receive additional data from the master device. The master device can then continue sending any number of bytes of data 316 and 318 to the slave device that corresponds with the flow control write command 308. In yet other examples, the master device can send more than two bytes of data to a slave device. For example, the master device may send the slave device any number of bytes of data with a maximum equal to the number of bytes the slave device can store in the slave device's initial write buffer. In some embodiments, the initial write buffer size of a slave device is sent to a master device during the capability response previously discussed in relation to FIG. 2.

The timing diagram of FIG. 3 illustrates one example of a master device sending a write command to a slave device through a SPI bus. Additionally, a slave device can delay the master device for any suitable number of clock cycles before storing data received as part of the flow control write command.

Figure 4:
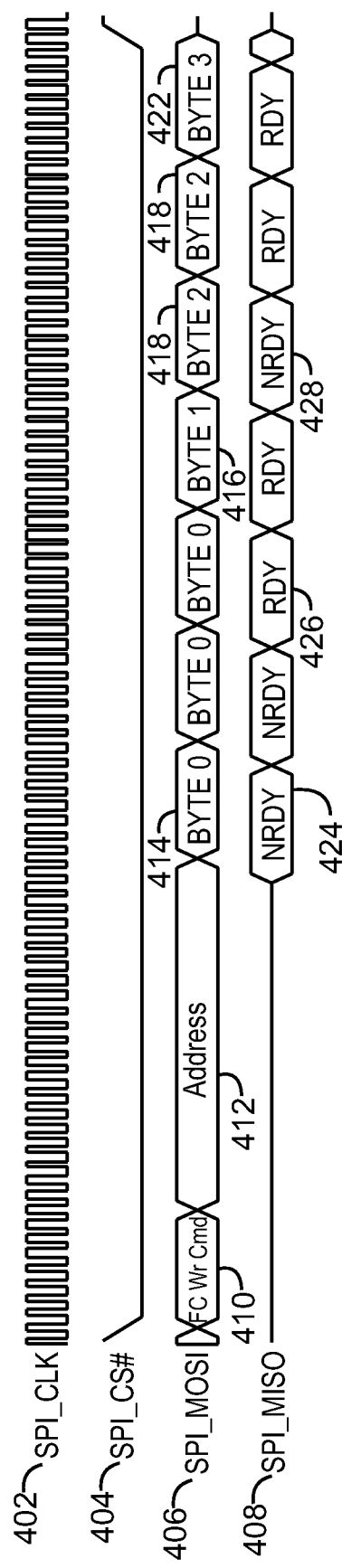
FIG. 4 is an example of a timing diagram for a master device sending a flow control write command to a slave device.

FIG. 4 is an is an example of a timing diagram for a master device sending a flow control write command to a slave device. The timing diagram includes a clock (also referred to herein as SPI_CLK) 402, and three signals including a chip select signal (also referred to as SPI_CS#) 404, a master-out slave-in signal (also referred to herein as SPI_MOSI) 406, and a master-in slave-out signal (also referred to herein as SPI_MISO) 408. As discussed above, the clock 402 can enable synchronized communication between a master device and a slave device. The chip select signal 404 can indicate to a particular slave device that the slave device is selected to communicate with the master device. The SPI_MOSI 406 can transmit data from the master device to the slave device and the SPI_MISO 408 can transmit data from the slave device to the master device.

In some embodiments, the master device can send a flow control write command 410 to the slave device through SPI_MOSI 406. The master device can also send a memory address 412 to the slave device through SPI_MOSI 406 that indicates the memory address to store data in the slave device. The master device may also send the first byte or a first set of bytes to the slave device through SPI_MOSI 406. If the master device receives a not-ready indicator 424 from the slave device through SPI_MISO 408, the master device can repeat the first byte of data or first set of bytes of data. For example, the slave device sends two not-ready indicators 424 through SPI_MOSI 408 in FIG. 4. The master device continues to send the slave device the first byte of data 414 through SPI_MOSI 406. Once the slave device transmits a ready indicator 426 to the master device through SPI_MISO 408, the master device transmits additional bytes of data 416, 418, and 422 to the slave device. In some examples, additional bytes of data may also be repeatedly sent from the master device to the slave device if the slave device sends a not-ready indicator 424 to the master device. For example, byte 2 418 can be transmitted twice from the master device to the slave device in response to a not-ready indicator 428 transmitted from the slave device to the master device. After all the data bytes are sent, the master device terminates communication with the slave device by deasserting the chip select signal of the slave device. The timing diagram of FIG. 4 illustrates one example of a master device sending a flow control write command to a slave device through a SPI bus.

Figure 5:
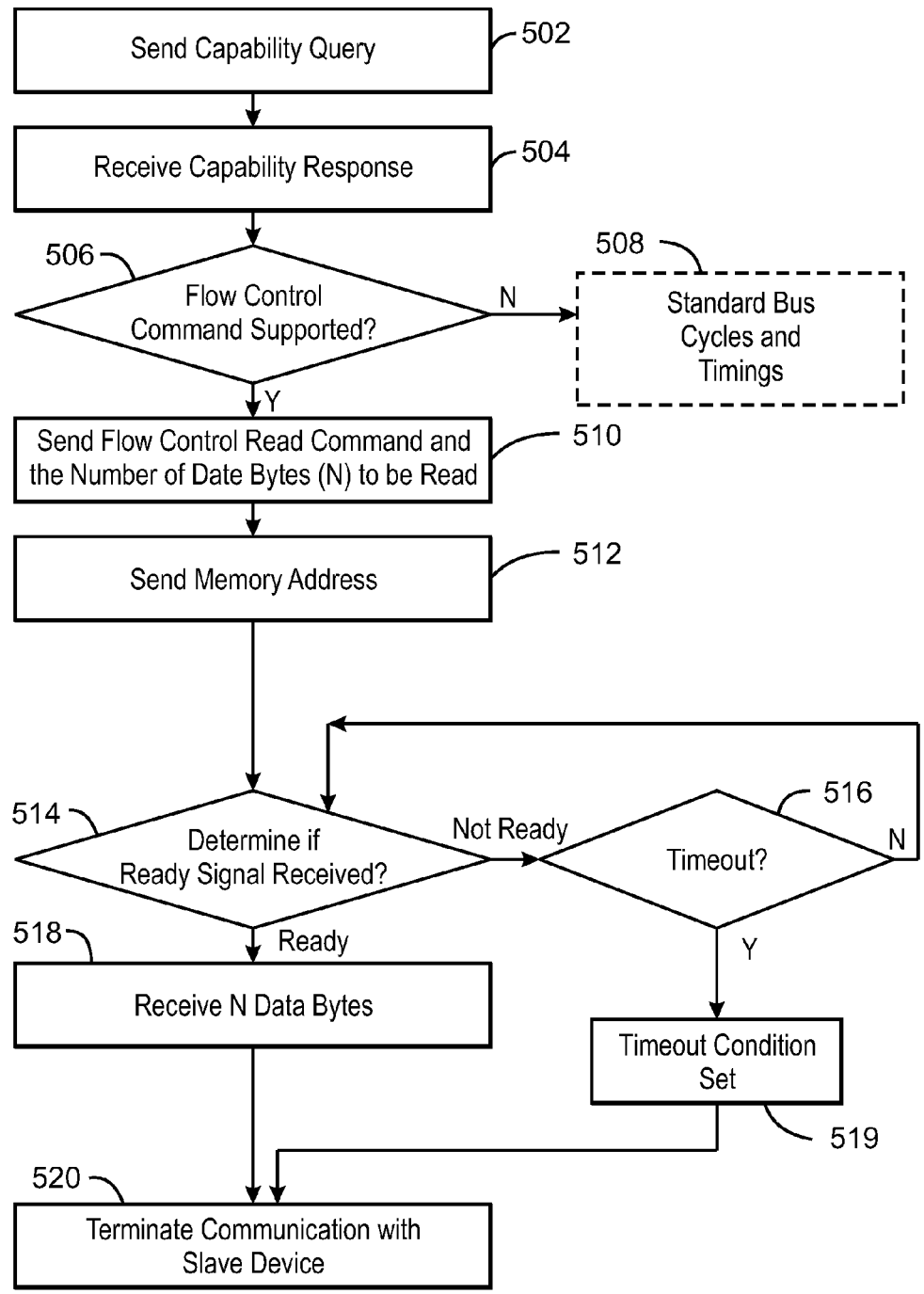
FIG. 5 is a process flow diagram illustrating an example of a method for sending a flow control read command from a master device to a slave device using a SPI bus.

FIG. 5 is a process flow diagram illustrating an example of a method for sending a flow control read command from a master device to a slave device using a SPI bus. The method 500 can be used to allow for flow control between a master device and a slave device, communicating through a SPI bus in a computing system, such as the computing system 100 of FIG. 1. The method 500 may be implemented by hardware components that can send a flow control read command, such as a memory controller device 116 or a NIC 114.

At block 502, the master device sends a capability query to the slave device. The capability query can detect whether a slave device can recognize and support flow control commands. At block 504, the master device receives a capability response from the slave device. The capability response may indicate whether a slave device can detect flow control commands, bi-directional use of the signal lines, and the like. At block 506, the master device determines if the capability response from the slave device indicates that the slave device can support flow control commands. If the slave device does not support flow control commands then the process flow continues to block 508 by sending standard read commands to the slave device and expecting the standard SPI bus protocol cycles and timings. If the slave device supports flow control commands, then the process flow proceeds to block 510 and sends a flow control read command along with a number of bytes of data to be read. A flow control read command, as referred to herein, allows a master device to receive data from a slave device. The flow control read command can allow a master device to detect when a slave device can execute a read operation. In some examples, a flow control read command may indicate to the slave device to return a certain amount of data. For example, a read command may indicate that a certain number of bytes of data are to be transmitted from the slave device to the master device.

At block 512, a master device can send a memory address to a slave device. The memory address can indicate the location to retrieve data from the slave device. In some examples, the memory address can be stored in a register or buffer in the slave device. In these examples, the memory address may be accessed at a later time when the slave device can execute the read command. For example, the slave device may receive a memory address corresponding to a read command. The slave device may execute another operation for any suitable number of clock cycles before the slave device can execute the read command. In this example, the slave device can store the memory address in a buffer or register until the read command is executed. In some examples, after the read command is completed, the memory address can be removed or new data can be stored in the buffer or register.

At block 514, a master device can determine if a ready indicator is detected. As discussed above in relation to FIG. 2, the ready indicator can be an indicator of any suitable number of bits and any suitable bit patterns. For example, "11000111" may indicate to the master device that a slave device may execute the read command after any number of clock cycles. In some examples, the latency corresponding to the ready indicator may be reduced by appending a logical one to a series of logical zeros. For example, a ready indicator may be represented as "00001." In this example, a master device may wait five clock cycles to send data to a slave device instead of eight clock cycles if an 8-bit ready indicator is used by the slave device. If the master device determines that a not-ready indicator is detected, the process continues at block 516. If the master device determines that a ready indicator is detected, the process continues at block 518.

At block 516, the master device determines if a timeout value has exceeded a threshold. The timeout value can be stored as a counter and can indicate that a flow control command is to be terminated by the master device after the timeout value exceeds a threshold value. A timeout can indicate that the master device is to stop waiting for a ready indicated after the timeout value has exceeded a threshold. If a timeout value has not exceeded a threshold, the process flow returns to block 514 and the master device determines if a ready indicator has been received. If a timeout value has exceeded a threshold, the process flow continues at block 519 to set the timeout condition, and then proceeds to block 520 to end the process. A timeout condition may include setting a timeout register. A timeout condition may also include triggering other system alert mechanisms. At block 520, the process ends and the master device terminates communication with the slave device. In some examples, the master device can terminate communication with the slave device by negating a communication signal associated with the slave device.

At block 518, a master device can receive a ready indicator and data from a slave device. In some examples, the data retrieved from the slave device is sent to the master device following the ready indicator. For example, a ready indicator of "10101010" may be sent to the master device followed by the data requested from the slave device in the read command. The flow control read process ends at block 520.

The process flow diagram of FIG. 5 is not intended to indicate that the steps of the method 500 are to be executed in any particular order, or that all of the steps of the method 500 are to be included in every case. For example, the master device may not send a capability query to the slave device. In some examples, the master device may detect whether a slave device can support flow control commands based on a particular implementation. Further, any number of additional steps may be included within the method 500, depending on the specific application.

Figure 6:
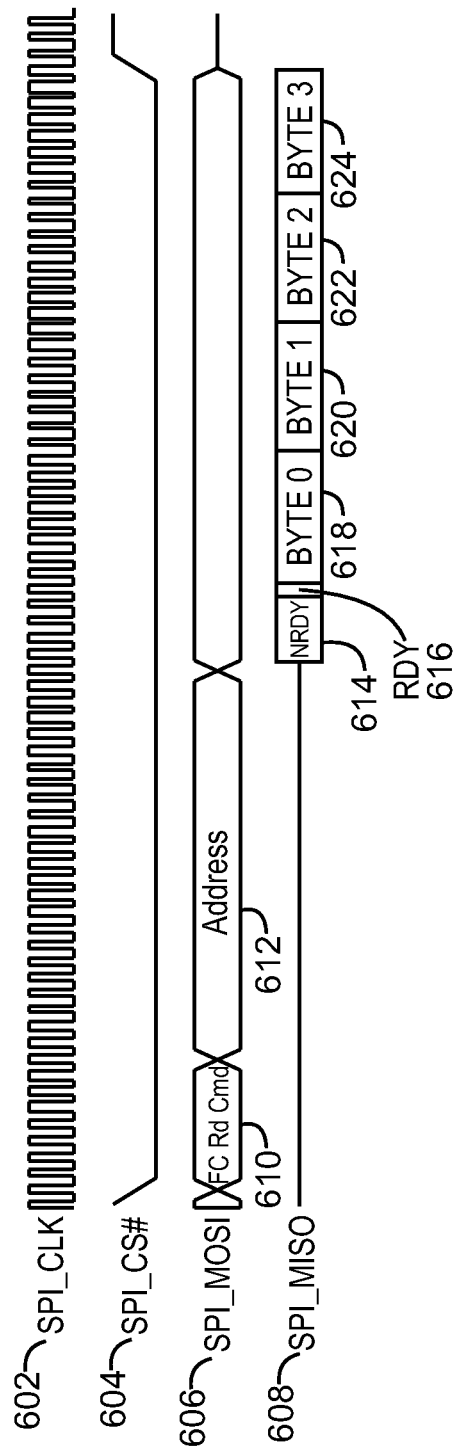
FIG. 6 is an example of a timing diagram for a master device sending a flow control read command to a slave device.

FIG. 6 is an example of a timing diagram for a master device sending a flow control read command to a slave device. The timing diagram includes a clock signal 602, and three logical signals including a chip select signal SPI_CS#604, a master-out slave-in signal SPI_MOSI 606, and a master-in slave-out signal SPI_MISO 608. The detail descriptions of these signals are similar to the previous descriptions of the signals previously discussed in relation to FIGS. 3 and 4. The master-out slave-in signal 606, also referred to as SPI_MOSI, can transmit commands from the master device to the slave device. In some examples, the master device can send a flow control read command 610 to a slave device through the master-out slave-in signal 606 after the chip select signal 604 is asserted for the slave device. The master device can also send a memory address 612 through the master-out slave-in signal 606 to the slave device. The memory address 612 indicates a starting location in the memory of the slave device to read data from the master device.

The master-in slave-out signal 608, also referred to as SPI_MISO, can transmit data and indicators from the slave device to the master device. In some examples, as the master-out slave-in signal 606 transmits a flow control read command 610 and a memory address 612 from the master device to the slave device, the slave device turns off the SPI_MISO signal 608. In some embodiments, the flow control read command 610 also includes the number of data bytes to be read from the local memory of the slave device. The starting memory address of the bytes to be read can be indicated by the memory address 612.

In some examples, the slave device can also send indicators to the master device through the master-in slave-out signal 608. The indicators can include a not-ready indicator 614 and a ready indicator 616, among others. The slave device can send a not-ready indicator 614 to the master device through the master-in slave-out signal 608 if the slave device is busy. For example, the slave device may be busy when the slave device continues to store data sent in previous write commands. The slave device can send a ready indicator 616 to the master device when the slave device is ready to send the data requested to the master device.

In some examples, any number of bytes 618, 620, 622, and 624 may be transmitted by the slave device through the SPI_MISO signal 608, while the slave device ignores the state of the SPI_MOSI signal 606. Also, if the master device determines a timeout has occurred, the master device terminates communication with the slave device by deasserting the SPI_CS#604 of the slave device. If the state of the SPI_CS#604 changes, the master device and the slave device may no longer transmit data for a particular flow control command through the SPI_MOSI 606 and the SPI_MISO 608 signals.

The timing diagram of FIG. 6 illustrates one example of a master device sending a flow control read command to a slave device through a SPI bus. Additionally, a slave device can delay the master device for any suitable number of clock cycles before sending data as part of the flow control read command.

Figure 7:
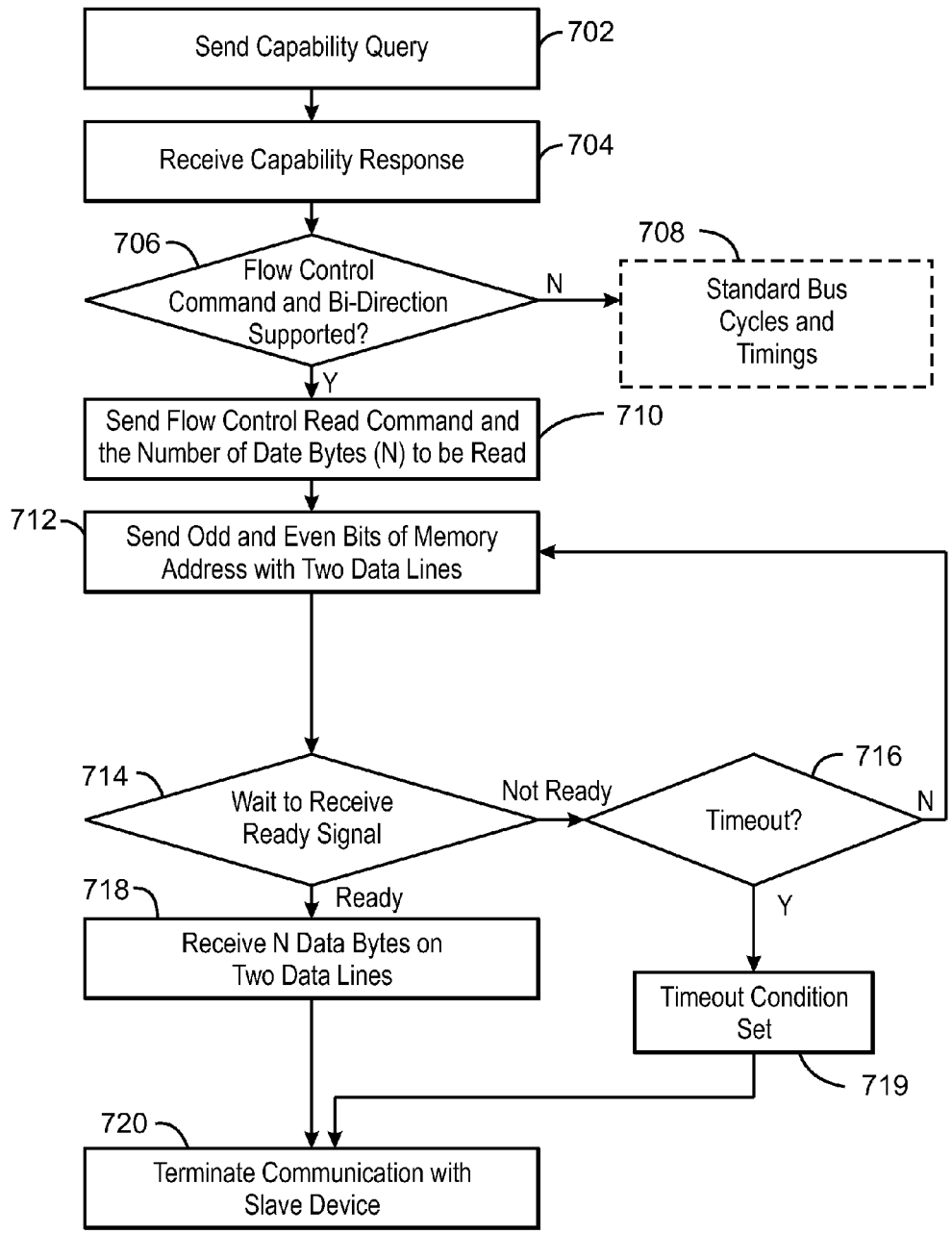
FIG. 7 is a process flow diagram illustrating an example of a method for a master device to send a flow control read command to a slave device using a SPI bus.

FIG. 7 is a process flow diagram illustrating an example of a method for a master device to send a flow control read command to a slave device using a SPI bus. The method 700 can be used to allow for flow control between a master device and a slave device, communicating through a SPI bus in a computing system, such as the computing system 100 of FIG. 1. The method 700 may be implemented by hardware components that can send a flow control read command, such as a memory controller device 116 or a NIC 114.

At block 702, the master device sends a capability query to the slave device. The capability query can detect whether a slave device can recognize and support flow control commands. At block 704, the master device receives a capability response from the slave device. The capability response may indicate whether a slave device can detect flow control commands, bi-directional use of the signal lines, and the like. At block 706, the master device determines if the capability response from the slave device indicates that the slave device can support flow control commands. If the slave device does not support flow control commands then the process flow continues to block 708 by sending standard read commands to the slave device and expecting the standard SPI bus protocol cycles and timings. If the slave device supports flow control commands, then the process flow proceeds to block 710 and sends a flow control read command along with a number of bytes of data to be read.

At block 712, the master device can transmit the memory address simultaneously through a SPI_MOSI signal and a SPI_MISO signal. For example, the master device may send even bits for a memory address on the SPI_MOSI signal, and the master device may send odd bits for the memory address on the SPI_MISO signal. In some examples, the master device can send a memory address to the slave device on the SPI_MISO signal line because the slave device turns off the SPI_MISO line as the master device sends the memory address to the slave device. The master device may send the memory address to the slave device up to twice as fast by sending even bits and odd bits for the memory address in parallel using both the SPI_MISO and SPI_MOSI signal lines.

At block 714, the master device can determine if a ready indicator or a not-ready indicator has been received from the slave device. In some embodiments, the master device may send the even-data bits and odd-data bits from the memory address to the slave device. The slave device may then send a ready or a not-ready indicator to the master device. If a not-ready indicator has been received by the master device, the process flow continues at block 716. If a ready indicator is received by the master device, the process flow continues at block 718.

At block 716, the master device determines if a timeout value has exceeded a threshold. The timeout value can be stored as a counter and can indicate that a flow control command is to be terminated by the master device after the timeout value exceeds a threshold value. A timeout can indicate that the master device is to stop waiting for a ready indicated after the timeout value has exceeded a threshold. If a timeout value has not exceeded a threshold, the process flow returns to block 714 and checks for the ready indicator. If a timeout value has exceeded a threshold, the process flow continues at block 719 to set the timeout condition, and then proceeds to block 720 to end the process. A timeout condition may include setting a timeout register. A timeout condition may also include triggering other system alert mechanisms. At block 720, the process ends and the master device terminates communication with the slave device by deasserting the chip select signal of the slave device.

When a ready indicator is detected at block 714, the process flow continues at block 718. At block 718, data is transmitted from the slave device to the master device. In some embodiments, the even-data bits may be transmitted through the SPI_MOSI signal and the odd-data bits may be transmitted through the SPI_MISO signal. In some examples, the slave device may send data on the SPI_MOSI signal line when the master device has finished sending the flow control command and the memory addresses. In other embodiments, both the even-data bits and the odd-data bits may be transmitted through the SPI_MISO signal. The process flow ends at block 720 and the master device terminates communication with the slave device by deasserting the chip select signal of the slave device.

The process flow diagram of FIG. 7 is not intended to indicate that the steps of the method 700 are to be executed in any particular order, or that all of the steps of the method 700 are to be included in every case. For example, the master device may not send a capability query to the slave device. In some examples, the master device may detect whether a slave device can support flow control commands based on a particular implementation. Further, any number of additional steps may be included within the method 700, depending on the specific application.

Figure 8:
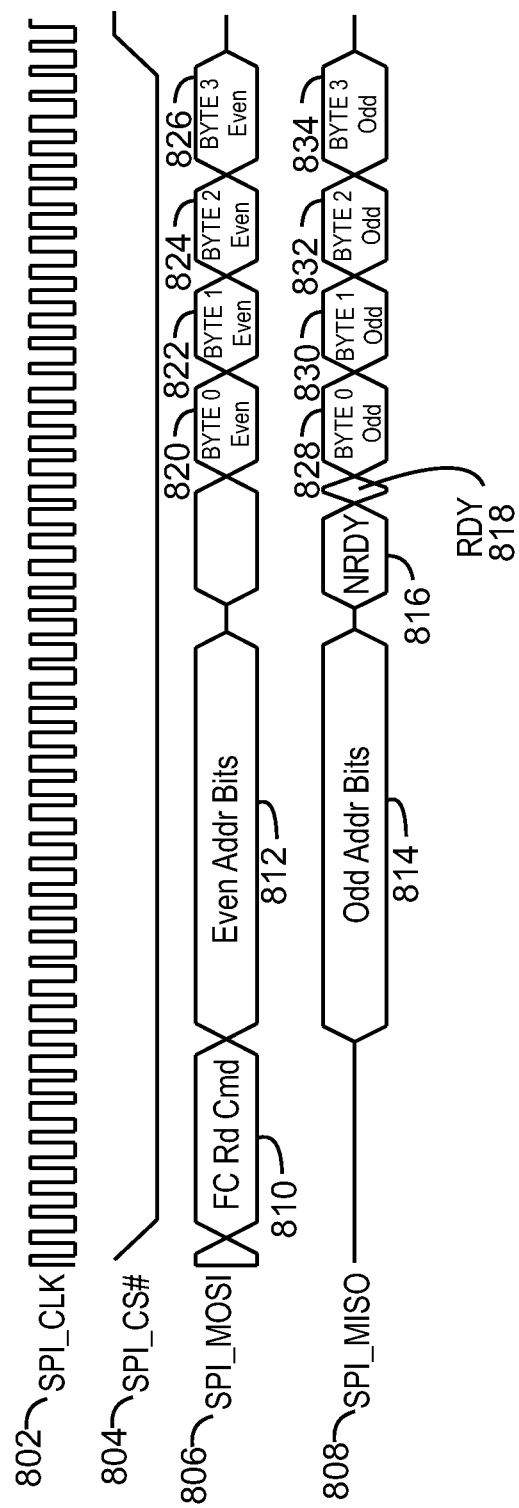
FIG. 8 is an example of a timing diagram for a master device sending a flow control read command to a slave device.

FIG. 8 is an example of a timing diagram for a master device sending a flow control read command to a slave device. The timing diagram includes a clock signal (also referred to herein as SPI_CLK) 802, and three logical signals including a chip select signal SPI_CS#804, a master-out slave-in signal SPI_MOSI 806, and a master-in slave-out signal SPI_MISO 808. The detailed descriptions of these signals are similar to the previous descriptions of the signals previously discussed in relation to FIGS. 3, 4, and 6. The SPI_MOSI signal 806 can transmit commands, such as the flow control read command, from the master device to the slave device. The master device can also send the even memory address data bits 812 and the odd memory address data bits 814 through the SPI_MOSI signal 806 and the SPI_MISO signal 808 to the slave device. The memory address data bits 812 and 814 indicate the starting location of the data stored in the memory attached to the slave device.

In some embodiments, the SPI MOSI 806 and the SPI_MISO 808 can be used for the slave device to transmit data to the master device. After the flow control read command 810 and the memory addresses 812 and 814 are transmitted from the master device to the slave device, the master device turns off the SPI_MOSI signal 806 and then reads the SPI_MISO signal 808 for the ready indicator. The slave device can transmit a not-ready indicator 816 or a ready indicator 818. When the slave device transmits a not-ready indicator 816 to the master device on the SPI_MISO signal 808, the master device continues to sample the SPI_MISO signal 808. When the slave device transmits a ready indicator 818 to the master device through the SPI_MISO signal 808, the master can receive data from the slave device through both the SPI_MOSI signal 806 and SPI_MISO signal 808. For example, the even bits of data 820, 822, 824, and 826 may be transmitted from the slave device to the master device through the SPI_MOSI signal 806 and the odd bits of data 828, 830, 832, and 834 may be transmitted from the slave device to the master device through the SPI_MISO signal 808. The Byte 0 even data bits 820 and Byte 0 Odd data bits 828 can comprise the first byte of data returned in response to the flow control read command at the memory address. Similarly, the memory address may also be comprised of even memory address bits 812 and odd memory address bits 814. In some examples, a slave device can delay the master device for any suitable number of clock cycles before sending data as part of the flow control read command.

Figure 9:
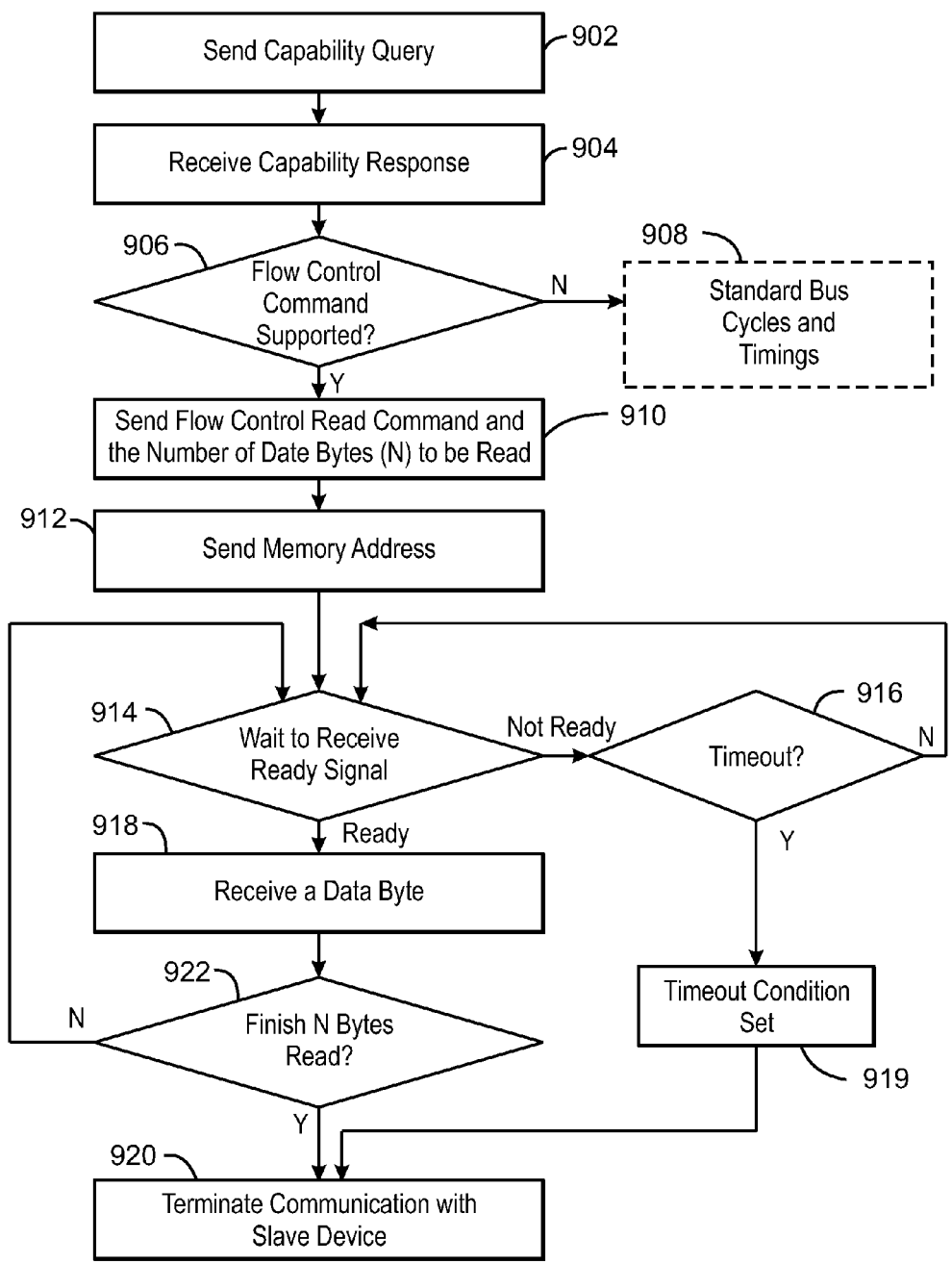
FIG. 9 is a process flow diagram illustrating an example of a method for a master device to send a flow control read command to a slave device using a SPI bus.

FIG. 9 is a process flow diagram illustrating an example of a method for a master device to send a flow control read command to a slave device using a SPI bus. The method 900 can be used to allow for flow control between a master device and a slave device communicating through a SPI bus in a computing system, such as the computing system 100 of FIG. 1. The method 900 may be implemented by hardware components that can send a flow control read command, such as a memory controller device 116 or a NIC 114.

At block 902, the master device sends a capability query to the slave device. The capability query can detect whether a slave device can recognize and support flow control commands. At block 904, the master device receives a capability response from the slave device. The capability response may indicate whether a slave device can detect flow control commands, bi-directional use of the signal lines, and the like. At block 906, the master device determines if the capability response from the slave device indicates that the slave device can support flow control commands. If the slave device does not support flow control commands then the process flow continues to block 908 by sending standard read commands to the slave device and expecting the standard SPI bus protocol cycles and timings. If the slave device supports flow control commands, then the process flow proceeds to block 910 and sends a flow control read command along with a number of bytes of data to be read.

At block 912, a master device can send a memory address to a slave device. The memory address can indicate the location to retrieve data from the slave device. In some examples, the memory address can be stored in a register or buffer in the slave device. At block 914, a master device can determine if a ready indicator is detected. As discussed above in relation to FIG. 2, the ready indicator can be an indicator of any suitable number of bits and any suitable bit patterns. For example, "11000111" may indicate to the master device that a slave device may execute the read command after any number of clock cycles. If the master device determines that a not-ready indicator is detected, the process continues at block 916. If the master device determines that a ready indicator is detected, the process continues at block 918.

At block 916, the master device determines if a timeout value has exceeded a threshold. The timeout value can be stored as a counter and can indicate that a flow control command is to be terminated by the master device after the timeout value exceeds a threshold value. A timeout can indicate that the master device is to stop waiting for a ready indicated after the timeout value has exceeded a threshold. If a timeout value has not exceeded a threshold, the process flow returns to block 914 and the master device determines if a ready indicator has been received. If a timeout value has exceeded a threshold, the process flow continues at block 919 to set the timeout condition, and then proceeds to block 920 to end the process. A timeout condition may include setting a timeout register. A timeout condition may also include triggering other system alert mechanisms. At block 920, the process ends and the master device terminates communication with the slave device by deasserting the chip select signal of the slave device.

At block 918, a master device can receive a data byte sent by a slave device and the process flow can continue at block 922. At block 922, the master device can determine if the requested data bytes have been read. If all the requested data bytes have not been read then the process flow returns to block 914. If all the requested data bytes have been read by the master device then the process flow ends at block 920 where the master device terminates communication with the slave device. In some examples, the master device can terminate communication with the slave device by negating a communication signal associated with the slave device.

The process flow diagram of FIG. 9 is not intended to indicate that the steps of the method 900 are to be executed in any particular order, or that all of the steps of the method 900 are to be included in every case. For example, the master device may not send a capability query to the slave device. In some examples, the master device may detect whether a slave device can support flow control commands based on a particular implementation. Further, any number of additional steps may be included within the method 900, depending on the specific application.

Figure 10:
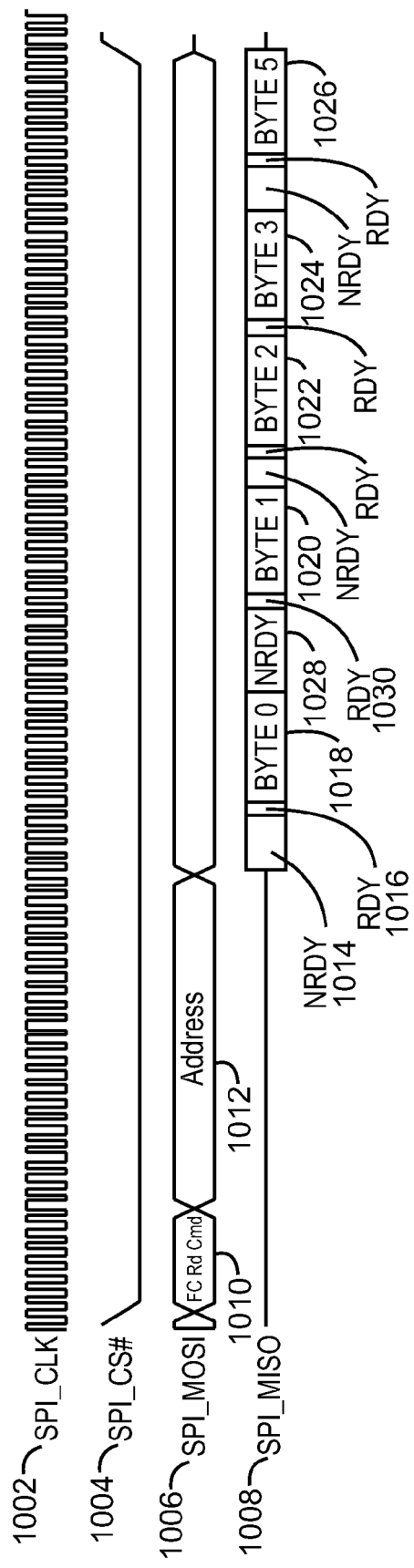
FIG. 10 is an example of a timing diagram for a master device sending a flow control read command to a slave device.

FIG. 10 is an example of a timing diagram for a master device sending a flow control read command to a slave device. The timing diagram includes a clock signal 1002, and three signals including a chip select signal SPI_CS#1004, a master-out slave-in signal SPI_MOSI 1006, and a master-in slave-out signal SPI_MISO 1008. The detail descriptions of these signals are similar to the previous descriptions of the signals previously discussed in relation to FIGS. 3, 4, 6, and 8. The master-out slave-in signal 1006, also referred to as SPI_MOSI, can transmit commands from the master device to the slave device. In some examples, the master device can send a flow control read command 1010 to a slave device through the master-out slave-in signal 1006 after the master device asserts the chip select signal (also referred to herein as SPI_CS#) 1004. The master device can also send a memory address 1012 through the master-out slave-in signal 1006 to the slave device. The memory address 1012 indicates the starting location in the memory of the slave device to read the data bytes from a target memory device.

The SPI_MISO signal 1008 can transmit data and indicators from the slave device to the master device. In some examples, as the SPI_MOSI signal 1006 transmits a flow control read command 1010 and a memory address 1012 from the master device to the slave device, the slave device turns off the SPI_MISO signal 1008. In some embodiments, the flow control read command 1010 also includes the number of data bytes to be read from the local memory of the slave device. The starting memory address of the bytes to be read can be indicated by the memory address 1012.

In some examples, the slave device can also send indicators to the master device through the SPI_MISO signal 1008. The indicators can include a not-ready indicator 1014 and a ready indicator 1016, among others. The slave device can send a not-ready indicator 1014 to the master device through the SPI_MISO signal 1008 if the slave device is busy. For example, the slave device may use additional time to acquire the data from its memory. The slave device can send a ready indicator 1016 to the master device when the slave device is ready to send the data requested to the master device.

In one example, the slave device may transmit a byte of data 1018 after a ready-indicator is sent to the master device through the SPI_MISO 1008 signal. The slave device may also transmit a not-ready indicator 1028 for any number of clock cycles. The slave device can then send a ready indicator 1030 followed by another byte of data 1020. Similarly, the remaining data bytes 1022, 1024 and 1026, or any number of data bytes can be transmitted by the slave device to the master device.

The timing diagram of FIG. 10 illustrates one example of a master device sending a flow control read command to a slave device through a SPI bus. In other examples, any number of logic signals can be transmitted by the master device for the flow control read command and for the master device to receive data from the slave device, corresponding to the flow control read command.

Figure 11:
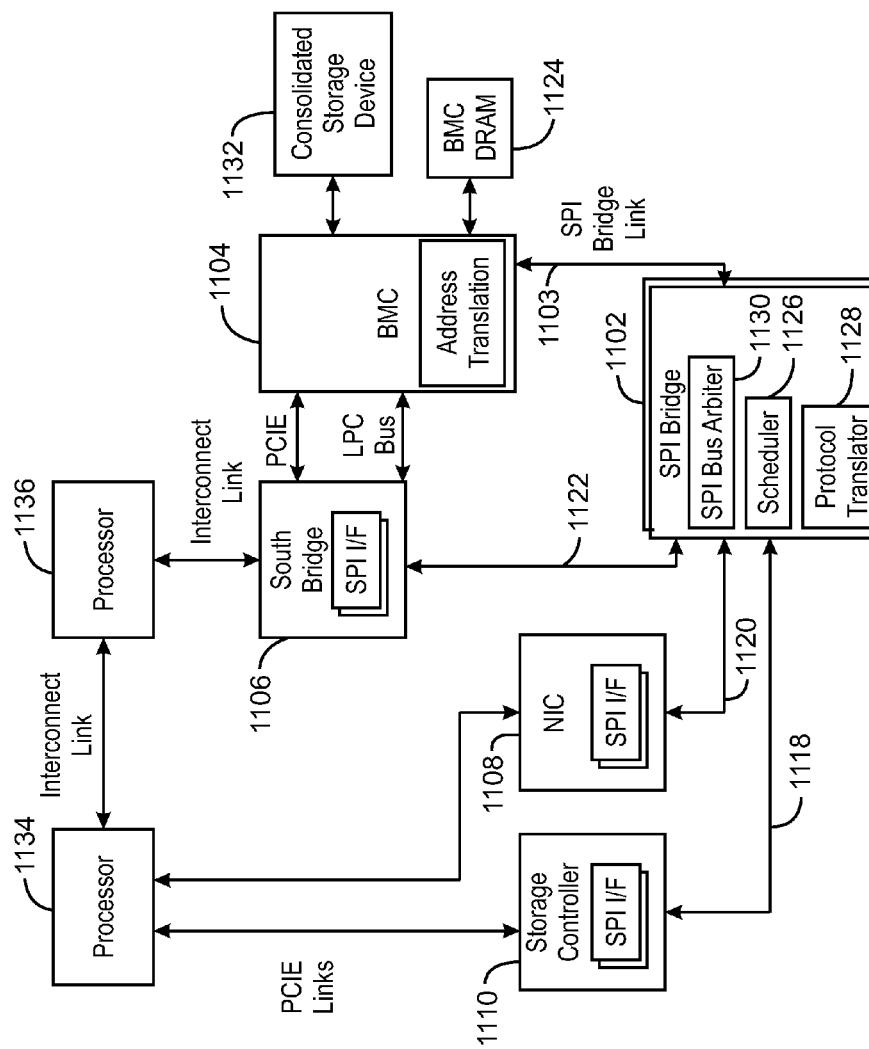
FIG. 11 is a block diagram illustrating an example of a computing system that implements a Serial Peripheral Interface bus bridge.

FIG. 11 is a block diagram illustrating an example of a computing system that implements a SPI bus bridge. The computing system can include a SPI bridge 1102 that can be electrically coupled to a baseboard management controller 1104 (also referred to herein as a BMC) and any number of suitable hardware components. For example, the SPI bridge 1102 can also be electrically coupled to multiple SPI master devices, such as a south bridge 1106, a NIC 1108, and a storage controller 1110. In this example, the SPI bridge 1102 can accept the SPI bus transactions from multiple SPI master devices 1110, 1108, 1106 as a SPI slave on independent SPI buses 1118, 1120, 1122, respectively, and relay the logical bus operations to a target device BMC 1104 by initiating a bus operation on the SPI bridge interface 1103. Example SPI bus transactions include read operations and write operations, among others. The BMC 1104 manages memory resources and responds to the memory read and memory write transactions relayed by the SPI bridge 1102 via the SPI bridge interface 1103. For example, the BMC 1104 may translate the memory addresses of the read and write operations to the mapped memory addresses of the consolidated storage device 1132 and the BMC DRAM device 1124. Flow control commands can be implemented for each of the independent SPI buses 1118, 1120, and 1122. The SPI bridge interface 1103 between the BMC 1104 and the SPI bridge 1102 can be any interface that allows the SPI bridge 1102 to convey the multiple SPI bus transactions to the BMC 1104. The SPI bridge interface 1102 can have different signal speeds and use different protocols than the SPI bus.

In some examples, the SPI bridge 1102 can process commands from multiple master devices. For example, the south bridge 1106, the NIC 1108, and the storage controller 1110 can also be master devices while the SPI bridge 1102 can be a slave device. The NIC 1108 can send a flow control write command to the SPI bridge 1102 via the SPI bus 1120, where the flow control write command may instruct the SPI bridge 1102 to write data to the BMC DRAM 1124 through the BMC 1104. The SPI bridge 1102 may complete a previous operation for the storage controller 1110 over the SPI bus 1118, before completing the flow control write command for the NIC 1108. As the SPI bridge 1102 completes the previous operation for the storage controller 1110 on the SPI bus 1118, the SPI bridge 1102 may send a not-ready indicator to the NIC 1108 on the SPI bus 1120. After the SPI bridge 1102 completes the previous operation for the storage controller 1110 on the SPI bus 1118, the SPI bridge 1102 can then send a ready indicator to the NIC 1108 and receive data corresponding to the flow control write command from the NIC 1108 on the SPI bus 1120.

In some examples, the SPI bridge 1102 may also include a scheduler 1126 to prevent starvation when multiple SPI master devices are competing for transactions through the SPI bridge 1102. Starvation, as referred to herein, is a state in which a process or command is perpetually denied access to resources. For example, starvation can include a state in which a slave device does not complete a command from a master device for a period of time by responding with a not-ready indicator on the corresponding SPI bus. In some examples, the scheduler 1126 included in the SPI bridge 1102 may detect that a period of time has elapsed since a master device initiated a flow control command through the SPI bridge 1102. The scheduler 1126 may then instruct the SPI bridge 1102 to complete the pending flow control command received from the master device.

In some examples, the SPI bridge 1102 may intercept a SPI bus request initiated by a master device by responding to the master device, instead of relaying the request to the BMC 1104 via the SPI bridge interface 1103. For example, data from previous read transactions may be cached in the local memory of the SPI bridge 1102 (not shown). In some examples, sequential data, such as large firmware images, may be pre-fetched from the slave device before a master device request.

The SPI bridge 1102 may contain a local memory (not shown) to store and retrieve firmware images for multiple master devices. In some examples, a consolidated storage device 1132 can store firmware images for any suitable number of master devices. For example, an updated version of a firmware image for the NIC 1108 may be stored on the consolidated storage device 1132 by the BMC 1104. The BMC 1104 may query the capability of the SPI bridge 1102 and if the SPI bridge 1102 has a local memory large enough to store a firmware image, the BMC 1104 may write the firmware image for the NIC 1108 in the local memory of the SPI bridge 1102. The NIC 1108 can later retrieve the firmware image by sending a flow control read command to the SPI bridge 1102. The SPI bridge 1102 can access and return the corresponding firmware image from the SPI bridge's local memory in response to the flow control read command for the NIC 1108.

It is to be understood that the block diagram of FIG. 11 is not intended to indicate that the computing system is to include all of the components shown in FIG. 11. Rather, the computing system 1100 can include fewer or additional components not illustrated in FIG. 11 (e.g., additional memory devices, micro-controllers, additional master devices, a protocol translator 1128, processors 1134 and 1136, etc.). For example, multiple SPI bridges may be connected to one another. In some examples, a master device may request data from a SPI bridge and the operation may be transmitted to a second SPI bridge before the operation is executed. Additionally, an arbiter module 1130 may be included in the SPI bridge 1102 that can manage the completion orders of the SPI buses attached, and manage the data transmitted between the SPI bridge 1102 and multiple master devices.

The present examples may be susceptible to various modifications and alternative forms and have been shown only for illustrative purposes. Furthermore, it is to be understood that the present techniques are not intended to be limited to the particular examples disclosed herein. Indeed, the scope of the appended claims is deemed to include all alternatives, modifications, and equivalents that are apparent to persons skilled in the art to which the disclosed subject matter pertains.

What is claimed is:

1. A method for flow control within a Serial Peripheral Interface comprising:
    determining a slave device supports a flow control capability;
    generating a flow control command with a master device;
    sending the flow control command from the master device to the slave device through a Serial Peripheral Interface bus;
    sending a memory address from the master device to the slave device;
    waiting to receive a first ready indicator from the slave device;
    communicating with the slave device in response to the first ready indicator, the master device transmitting or receiving a first of byte of data; and
    transmitting or receiving, via the master device, additional bytes of data in response to detecting a second ready indicator.

2. The method of claim 1, wherein communicating with the slave device in response to the first ready indicator comprises detecting data sent from the slave device.

3. The method of claim 1, wherein the slave device comprises a port in a Serial Peripheral Interface bridge.

4. The method of claim 3, wherein the Serial Peripheral Interface bridge comprises a scheduler to prevent starvation.

5. The method of claim 1 comprising:
    storing data for the master device and a second master device in the slave device; and
    retrieving data for one of the master devices from the slave device in response to the flow control command.

6. The method of claim 1 comprising terminating the communication with the slave device after a period of time by deasserting a chip select signal for the slave device.

7. The method of claim 1 comprising detecting the status of the flow control command with the first ready indicator, the second ready indicator, or a not-ready indicator.

8. A system for flow control within a Serial Peripheral Interface comprising:
    a slave device to receive a flow control command;
    a Serial Peripheral Interface bus to transmit the flow control command; and
    a master device to:
        generate the flow control command;
        send the flow control command from the master device to the slave device with a Serial Peripheral Interface;
        send a memory address from the master device to the slave device;

wait to receive a first ready indicator;

communicate with the slave device in response to the first ready indicator, the master device to transmit or receive a first of byte of data; and transmit or receive, via the master device, additional bytes of data in response to detecting a second ready indicator.

9. The system of claim 8, wherein the master device is to wait for a detection of the first ready indicator before sending data to the slave device.

10. The system of claim 8, wherein the master device is to wait for a detection of the first ready indicator before detecting data sent from the slave device.

11. The system of claim 8, wherein the slave device comprises a port in a Serial Peripheral Interface bridge.

12. The system of claim 11, wherein the Serial Peripheral Interface bridge comprises a scheduler to prevent starvation.

13. The system of claim 8 comprising the master device to:

store data for the master device and a second master device in the slave device; and retrieve data for one of the master devices from the slave device in response to the flow control command.

14. A system for flow control within a Serial Peripheral Interface comprising:

a master device to send a flow control command;

a Serial Peripheral Interface bus to transmit the flow control command; and a slave device to:

detect the flow control command;

detect a memory address;

send a first ready indicator to the master device;

communicate with the master device, the slave device to transmit or receive a first of byte of data; and transmit or receive, via the slave device, additional bytes of data in response to sending a second ready indicator.

15. The system of claim 14 wherein the slave device is to send the first ready indicator to the master device before sending data to the master device.

16. The system of claim 14, wherein the slave device is to send the first ready indicator to the master device before detecting data sent from the master device.

17. The system of claim 14, wherein the slave device comprises a port in a Serial Peripheral Interface bridge.

18. The system of claim 17, wherein the Serial Peripheral Interface bridge comprises a scheduler to prevent starvation.

19. The system of claim 14 comprising providing the status of the flow control command with a not-ready indicator, the first ready indicator, or the second ready indicator.

\* \* \* \* \*